US006992452B1

(12) United States Patent
Sachs et al.

(10) Patent No.: US 6,992,452 B1
(45) Date of Patent: Jan. 31, 2006

(54) DYNAMIC CURRENT LIMITING

(75) Inventors: Jason M. Sachs, Goffstown, NH (US); John David Heinzmann, Manchester, NH (US)

(73) Assignee: DEKA Products Limited Partnership, Manchester, NH (US)

( * ) Notice: Subject to any disclaimer, the term of this patent is extended or adjusted under 35 U.S.C. 154(b) by 0 days.

(21) Appl. No.: 10/726,164

(22) Filed: Dec. 2, 2003

Related U.S. Application Data

(60) Provisional application No. 60/430,217, filed on Dec. 2, 2002.

(51) Int. Cl.
*H02K 17/32* (2006.01)

(52) U.S. Cl. ........................ 318/434; 318/471; 318/681

(58) Field of Classification Search ................ 318/434, 318/471, 681, 566, 639, 678, 679; 361/103
See application file for complete search history.

(56) References Cited

U.S. PATENT DOCUMENTS

| | | | | |
|---|---|---|---|---|
| 3,600,650 | A | 8/1971 | Obenhaus et al. | 317/235 R |
| 3,990,020 | A | 11/1976 | Porter, III | 330/207 |
| 4,001,649 | A | 1/1977 | Young | 317/41 |
| 4,330,809 | A | 5/1982 | Stanley | 361/103 |
| 4,547,826 | A | 10/1985 | Premerlani | 361/25 |
| 4,924,112 | A | 5/1990 | Anderson et al. | 307/270 |
| 4,939,437 | A | 7/1990 | Farag et al. | 318/473 |
| 5,168,415 | A | 12/1992 | Osuga | 361/28 |
| 5,225,992 | A | 7/1993 | Kobari et al. | 364/483 |
| 5,295,034 | A | 3/1994 | Kleinmann et al. | 361/25 |
| 5,323,287 | A | 6/1994 | Peter | 361/74 |
| 5,502,957 | A | 4/1996 | Robertson | 56/11.9 |
| 5,600,575 | A | 2/1997 | Anticole | 364/557 |
| 6,092,927 | A | 7/2000 | Clemente | 374/163 |
| 2003/0113191 | A1 * | 6/2003 | Smith et al. | 414/274 |

OTHER PUBLICATIONS

Blasko et al., "On line Thermal Model and Thermal Management Strategy of a Three Phase Voltage Source Inverter", Industry Application Conference, 1999. pp. 1423-1431.

Lorenz "*Power Conversion Challenges with a Multidisciplinary Focus*", Power Conversion Conference, 2002. PCC Osaka 2002.

* cited by examiner

*Primary Examiner*—Karen Masih
(74) *Attorney, Agent, or Firm*—Bromberg & Sunstein LLP

(57) ABSTRACT

A system and method for generating commands for current subject to dynamic determinations of a limit. In one embodiment, the dynamically determined limit is a function of power dissipation in a component estimated from a measured current level and as a function of a measured temperature proximate to the component. In another embodiment, the limit is a lesser of two dynamically determined current levels. The system and method may be of particular use in a motor having limits determined with respect to a transistor and a motor winding. More particularly, estimated temperatures are established for a transistor and a motor winding for use in dynamically determining limits. Dynamic current limiting may be applied to a left and right wheeled vehicle such that the limit applied to both wheels is the lower of the limits dynamically determined for each wheel.

37 Claims, 10 Drawing Sheets

DYNAMIC CURRENT LIMITING

This present application claims priority from U.S. Provisional Application No. 60/430,217, filed Dec. 2, 2002, the full disclosure of which is hereby incorporated by reference herein.

BACKGROUND OF THE INVENTION

The invention relates to dynamically setting limits on commanded current, particularly with respect to motors.

Current limits are used in electronic circuitry in order to prevent excessive currents that may result in catastrophic failure of electronic components. Typically, if current is wildly excessive for a brief time or is high for an extended period of time, an electronic component can overheat resulting in failure. A maximum current level for each component can be determined for safe operation under all conditions. Unfortunately, by setting such a universally applicable current limit, higher power operation above that limit is prevented even when the component is cool or for otherwise acceptable short durations of time. For an electronic circuit controlling the operation of a motor, for example, such a limit may prevent high power brief duration maneuvers that would otherwise be desirable for the motorized unit being controlled. One way to overcome the limitation of such current limits is to provide larger and more expensive electronic components.

SUMMARY OF THE INVENTION

A method of an embodiment of the present invention generates commands for current and prevents the commands from exceeding a dynamically determined limit. The limit is determined as a function of power dissipation in a component as estimated from a measured current level and as a function of a measured temperature proximate to the component. In particular embodiments, the component may be motor windings or one or more power transistors, for example. A predetermined maximum temperature for the component may be used in setting the dynamic limit. The commands for current may be further prevented from exceeding a fixed limit or a second limit dynamically determined relative to a second component.

In a system issuing commands for current, a further embodiment of the invention includes determining a plurality of safe current levels and preventing current from exceeding the lowest of the levels. This can be accomplished by dynamically determining a first level of current that will not overheat a first component and dynamically determining a second level of current that will not overheat a second component. This system issues commands that are limited so as to prevent the commands from requesting current in excess of any of the first and second dynamically determined levels. The system may further prevent the commands from requesting current in excess of a fixed limit.

The system may be applied to motors where the components being considered may be motor windings and one or more power transistors. Dynamically determining a level based upon the motor windings includes dynamically determining power dissipation in the motor windings estimated from a measure of amount of a motor drive current. The safe current level is a function of estimated temperature of the motor windings. The estimated temperature is determined as a function of a measured temperature and as a function of estimated power dissipation in the motor windings. Dynamically determining power dissipation in the motor windings may be further estimated as a function of the estimated temperature of the motor windings. Using a predetermined maximum temperature for the motor windings, a safe current level can be set. In a particular embodiment, the motor is a brushless motor.

A safe current level for one or more power transistors is a function of estimated temperature of a transistor case. The estimated temperature is determined as a function of a temperature measured proximate the power transistor and as a function of estimated power dissipation in the power transistor. Dynamically determining power dissipation in power transistors is estimated from a measure of transistor current and is further estimated as a function of the estimated temperature of a transistor case. Using a predetermined maximum temperature for a power transistor junction, a safe current level can be set.

The system may be summarized in terms of measured quantities. A first safe current level for a motor is dynamically determined as a function of measured motor current and as a function of a measured temperature proximate the motor. In a three-phase motor where field-oriented control is used; the direct and quadrature currents may be calculated from the measured phase currents and along with measured temperature proximate the motor may be used to estimate motor winding temperature and, in turn, a safe current limit. A second safe level is dynamically determined as a function of the measured phase currents and as a function of measured temperature proximate the transistors. Again calculations can be performed using direct and quadrature current in the determination of the second safe level for three-phase motors. The commands for current are prevented from requesting current in excess of any of the first and second dynamically determined safe levels. In the case of the three phase motor, commands for direct and quadrature current are limited in magnitude to the lower of the two dynamically determined safe levels.

Dynamically determining a first safe level more specifically includes estimating temperature of the motor windings as a function of the measured temperature proximate the motor and as a function of the dynamically determined power dissipation in the motor windings and examining the estimated temperature relative to a predetermined maximum temperature for the motor windings. Dynamically determining power dissipation in the motor windings can be further refined so as to make it a function of the estimated temperature of the motor windings.

Dynamically determining a second safe level based on the power transistors more specifically includes estimating temperature for a transistor case as a function of the measured temperature proximate the transistor and as a function of the dynamically determined power dissipation in the transistors and using the estimated case temperature to get a safe current level to prevent the transistor junctions from exceeding a predetermined maximum temperature. Dynamically determining power dissipation in the transistors can be further refined so as to make it a function of the estimated temperature of the transistor case. If available, the determination may be a function of estimated transistor junction temperature.

Embodiments of the invention may be implemented using analog circuitry, a digital microprocessor or a computer program product. For example, a computer program product embodiment of the invention for use in controlling commands for motor current is a computer usable medium having computer readable code thereon. The computer readable program code includes program code for dynamically determining a first safe current level as a function of estimated temperature of motor windings, program code for dynamically determining a second safe current level as a function of estimated temperature of a power transistor, and program code for preventing the commands for motor current from requesting more than any of the first and second dynamically determined current levels. In addition, there may be program code for preventing the commands for motor current from exceeding a fixed limit.

A computer program product embodiment of the invention can be further viewed in terms of measured quantities. Computer readable program code includes program code for dynamically determining a first safe current level as a function of measured motor current and as a function of a measured temperature proximate the motor, program code for dynamically determining a second safe current level as a function of the measured motor current and as a function of measured temperature at the heat sink for the power transistors; and program code for preventing the commands for current from requesting more than any of the first and second dynamically determined current levels.

In a vehicle having a left wheel and a right wheel each separately driven by its respective motor, a particular embodiment of the invention dynamically determines a current command limit for each respective motor by applying a lowest of the dynamically determined current command limits to each of the respective motors so that current commands to each of the respective motors are subject to the same current command limit. This avoids unintentional turning of the vehicle due to unequal limits.

By allowing the command limit to be changed dynamically, higher currents may be permitted than would otherwise be possible if a fixed limit were all that was relied upon. Other objects and advantages of the present invention will become apparent during the following description of the presently preferred embodiments of the invention taken in conjunction with the drawings.

DETAILED DESCRIPTION OF PREFERRED EMBODIMENTS

Figure 1:
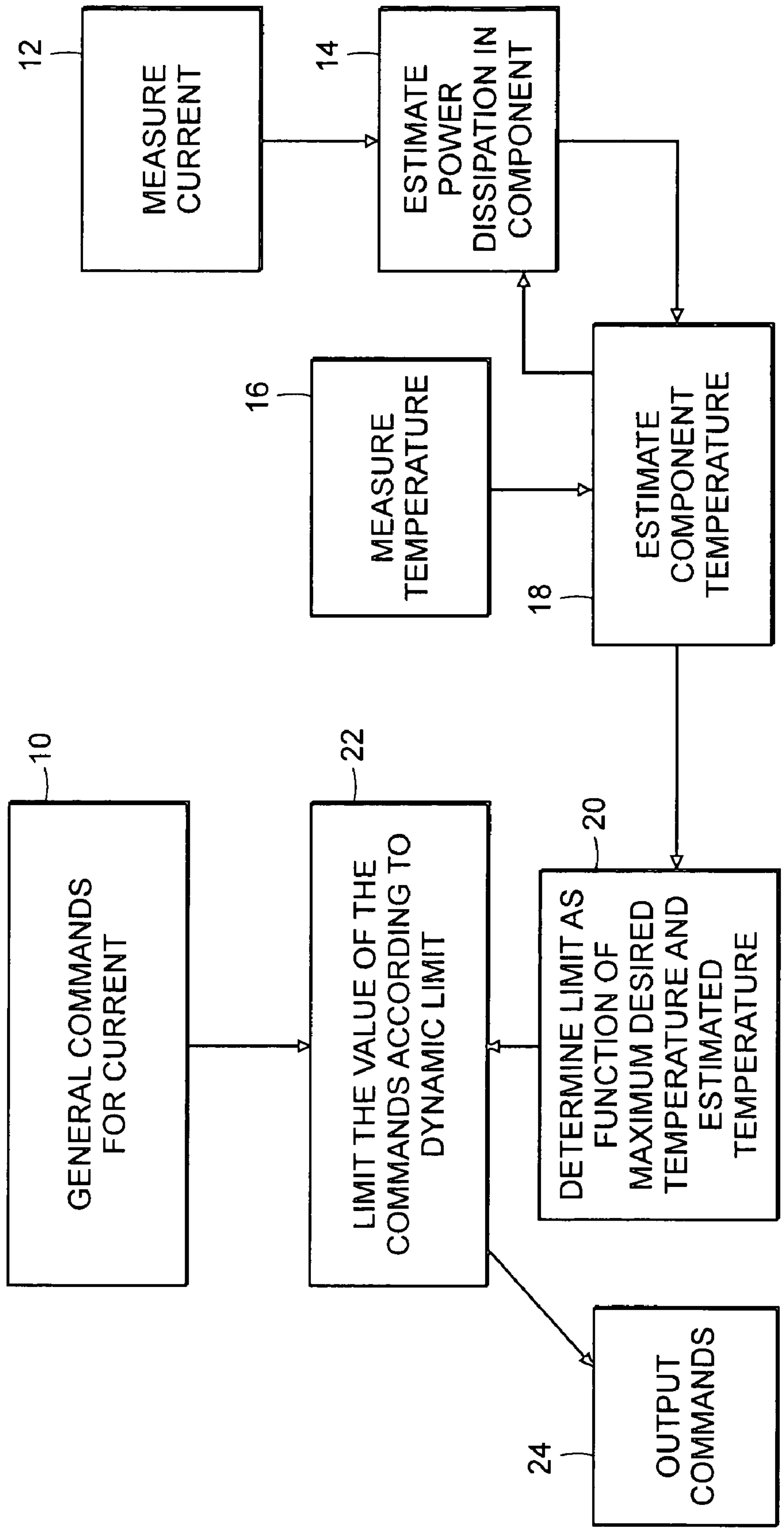
FIG. 1 is a flow chart of an embodiment of the present invention producing commands for current.

Referring to FIG. 1, a flow chart provides an overview of embodiments of methods of the present invention. Current commands may be generated 10 for and provided to any of a variety of components. In one particular embodiment, current commands are used for controlling a motor. A motion controller or speed control loop may be used in a known manner to generate current commands. The current commands regulate current through one or more power transistors which provide current to the motor windings. Any number of different devices may be operated by current commands in accordance with the present invention.

It is desirable to prevent the components from overheating and possibly failing as a result thereof. It is often difficult and expensive to obtain direct measurements of temperatures for the components of concern. Fortunately, a proxy for the temperature of the components of concern can be estimated. These estimates are used in accordance with embodiments of the invention to dynamically set a limit for current commands so as to permit high currents to be requested when the components are relatively cool and to impose stricter limits on current requests when the components become hot. In a motor drive, for example, this allows the drive to operate continuously, albeit at a reduced performance level, instead of causing the drive to be shut down, when components are nearing excessive temperatures.

In order to obtain an estimate of the component temperatures, current is measured 12 to provide a magnitude of current through the component of concern. Since current is directly related to the power through the component, an estimate of power dissipation in the component can be obtained 14. As a general matter, power dissipation is a function of the current through the component and the current waveform duty cycle and a voltage applied to the component $P_{diss}=f(I_A, V_{bus}, D_A)$ where I is current, $V_{bus}$ is voltage (for transistor $V_{bus}$ is the voltage applied across the transistor), D is duty cycle (the fraction of time that the transistor is turned on). Embodiments of the present invention may use any reasonable estimate of power dissipation based at least upon the current in the component. A specific estimation formula that has been found suitable for use in estimating power dissipation ($P_{diss}$) in a power MOSFET for driving a motor is that the power dissipation would be at worst a constant (K) times the current (I) squared times the duty cycle (D) times the on resistance of the transistor junction $R_{dson}$.

$$P_{diss} \leqq K \cdot I^2 \cdot D \cdot R_{dson}(T)$$

Switching losses which vary as a function of the bus voltage are approximated as a fraction of the $I^2R$ losses. Thus, a constant K is used to account for the $I^2$ R losses and the switching losses. Although switching losses are not computed directly, the approximation is made sufficiently conservative to avoid overheating of components. As the on resistance (R) of the transistor varies with temperature (T), this formula can be refined, if desired, by feeding back an estimate of the component temperature so as to modify the value of on resistance used in the formula.

Temperature has a great influence on the amount of current a component can handle. Therefore, in dynamically determining a safe current limit, an estimate of the component temperature is determined 18. The component temperature estimated will typically be either the hottest temperature in the component of concern or the temperature of a close thermal element that has a large thermal capacitance. When the hottest temperature is expected in an area that changes temperature rapidly relative to the measurement and processing rate of the temperature estimation system, such as in a semiconductor junction, the latter is preferred. It is preferable to be relying upon a slower moving temperature and therefore a temperature at an area of large thermal capacitance. Since the safe current level will depend on the hottest temperature which in turn depends on the current limit, there is potential for an unstable feedback loop which is avoided if temperature for a thermal element with large thermal capacitance is estimated. In the case of motor windings, the temperature of the windings is estimated. In the case of a power transistor, the transistor case temperature is estimated.

A temperature is measured proximate to the component 16, somewhere as close as can conveniently be obtained, such as on the circuit board. For example, the temperature may be taken at a mount for a heat sink used in conjunction with the component of concern. In other examples, temperature may be obtained directly from the component simplifying the determination of the estimated temperature. Given the measured temperature, an estimate of the component temperature can be determined from which a safe current level can be set. Most often, the component temperature is estimated 18 as a function of the measured temperature proximate the component and the estimate of power dissipation in the component. These temperature estimators can be derived using conventional thermal modeling techniques.

A component's estimated temperature can be used to determine 20 a safe current level in view of a maximum desired temperature. The safe current level is dynamically determined because it changes over time as the estimated temperature changes. If the component heats up slowly, a standard proportional (P) or proportional-integral (PI) feedback loop can be used to calculate the current limit. The current limit is set as a function of maximum temperature for the component minus the estimated temperature for the component. For example, a safe current level for motor windings can be calculated as:

$$I_{mLIM}=\sqrt{K(T_{max}-Test)}.$$

If the component includes a portion of concern that heats up quickly, it may be preferable to calculate what current would cause the portion of concern to heat up to the maximum desired temperature. This calculation would take into account the power dissipation estimated in the component. Thus, to determine a current limit, the maximum temperature $T_{max}$ of the portion of concern would be $$T_{max}=T_{est}+P_{max}\cdot R_{th}$$

where $T_{est}$ is an estimated temperature for the nearest slowly-heating portion of the component, $P_{max}$ is the maximum power dissipation, and $R_{th}$ is the thermal resistance between the portion of concern and the portion whose temperature has been estimated. This equation can be solved for $P_{max}$. Assuming the relationship between power dissipation $P_{max}$ and the current limit $I_{lim}$ is known, this can be solved for $I_{lim}$ as a function of the maximum temperature ($T_{max}$), the estimated temperature ($T_{est}$), and the thermal resistance. Such an equation can be solved directly or through using iterative techniques.

A safe current level for a set of power transistors can be calculated as $I_{sLIM}=\sqrt{(T_{MAX}-Test)/R_{SJC}R_{seff}}$ where $T_{MAX}$ is the maximum desired temperature for the semiconductor junction, $T_{est}$ is the estimated temperature of the transistor case, $R_{SJC}$ is the junction-to-case thermal resistance and $R_{seff}$ is the effective transistor on resistance. The dynamically determined safe current level may then be used to limit current commands issued by an external motion controller (e.g. speed control loop). When the generated current commands request a magnitude greater than the dynamic current limit, the magnitude of the command is cut or reduced to the value determined by the limit 22. For example, if the current limit were 17A at one particular time instant, commands greater than 17A would be reduced to 17A and commands less than −17A would be changed to −17A, while commands between −17A and 17A would be left unchanged. The thus-limited command is output 24.

In a typical application there may be more than one component of concern with respect to the quantity of current and potential component failure. In such a case, current limits may be obtained from calculations with respect to each of the components of concern. The lowest current limit from any of these calculations would be used to set the limit on the current commands. If desired a further determinant of a limit can be a fixed limit based upon a maximum current above which the current should never rise. The fixed limit used in conjunction with dynamically determined limits may be higher than would otherwise have been possible without the dynamic limits used to protect the components when they get hot. When a fixed limit is used among the selected limits, the applied limit would be the lowest from among the fixed limit and any of the dynamic limits set by the calculations for the components of concern.

Figure 2:
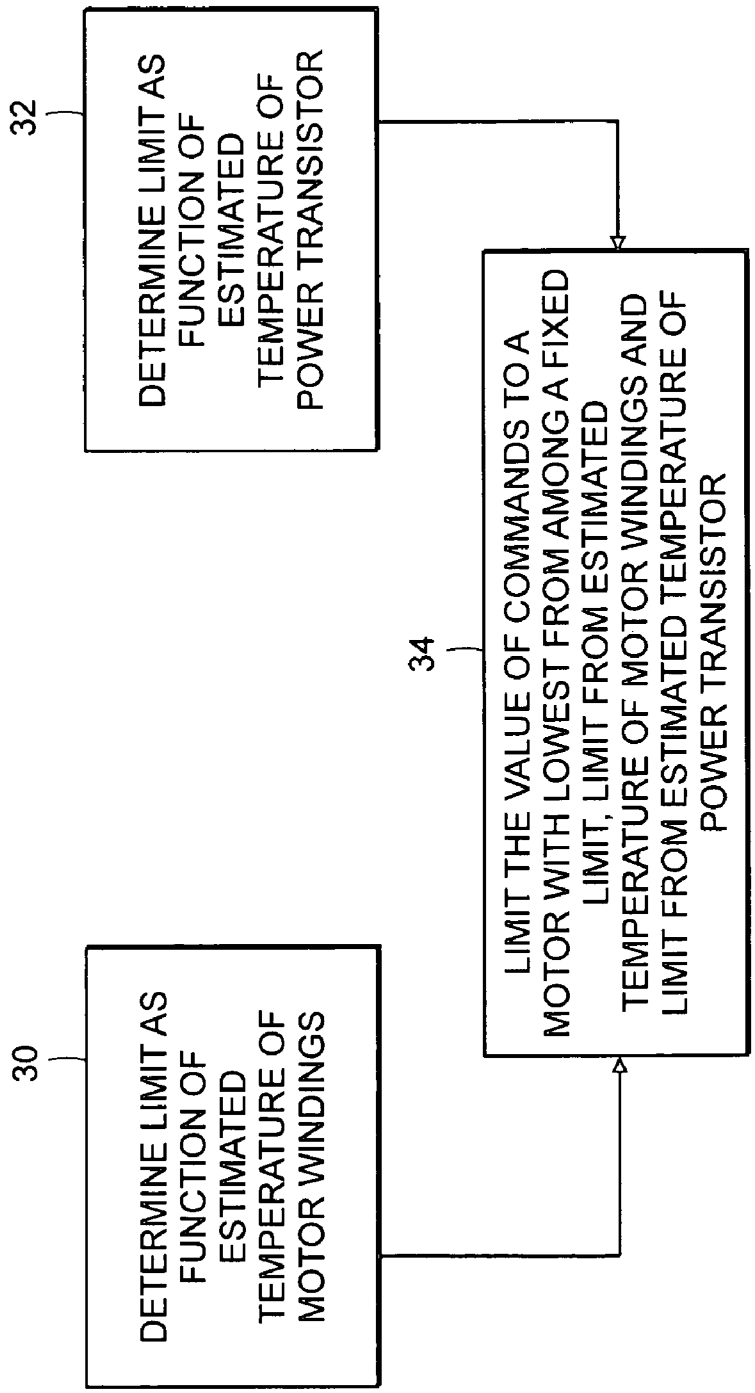
FIG. 2 is a flow chart of an embodiment of the present invention dynamically determining the limits on commands.

In a particular application in which current limits are being set in conjunction with control of a motor, components of concern may include the power transistors, the motor windings, motor connectors, and other conductors. Referring now to FIG. 2, a temperature of the motor windings is estimated for use in determining a dynamic limit 30. Similarly for the power transistors, a limit is dynamically determined as a function of an estimated temperature of a worst case power transistor 32. These estimates may be obtained by using current measurements and/or temperature measurements proximate the components. Generated commands requesting motor drive current may be limited by the limits determined with respect to the motor windings and power transistors 34. The value of the commands are limited to request no more than the lowest from among the limit determined from the estimated temperature of motor windings, the safe current level determined from the estimated power transistor temperature and, if desired, a fixed limit. Thus, the limit on the current commands may be adjusted dynamically as the motor operates.

Figure 3A:
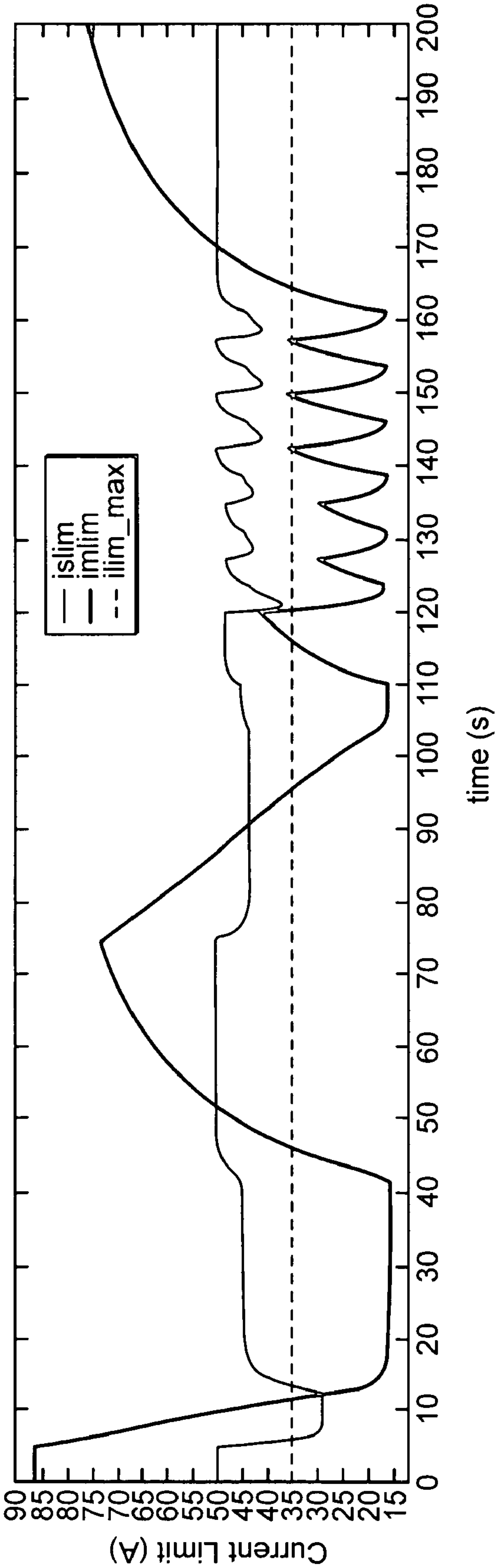
FIGS. 3*a*–*c* show graphically over time how the command limit is set as component currents and temperatures vary.
Figure 3B:
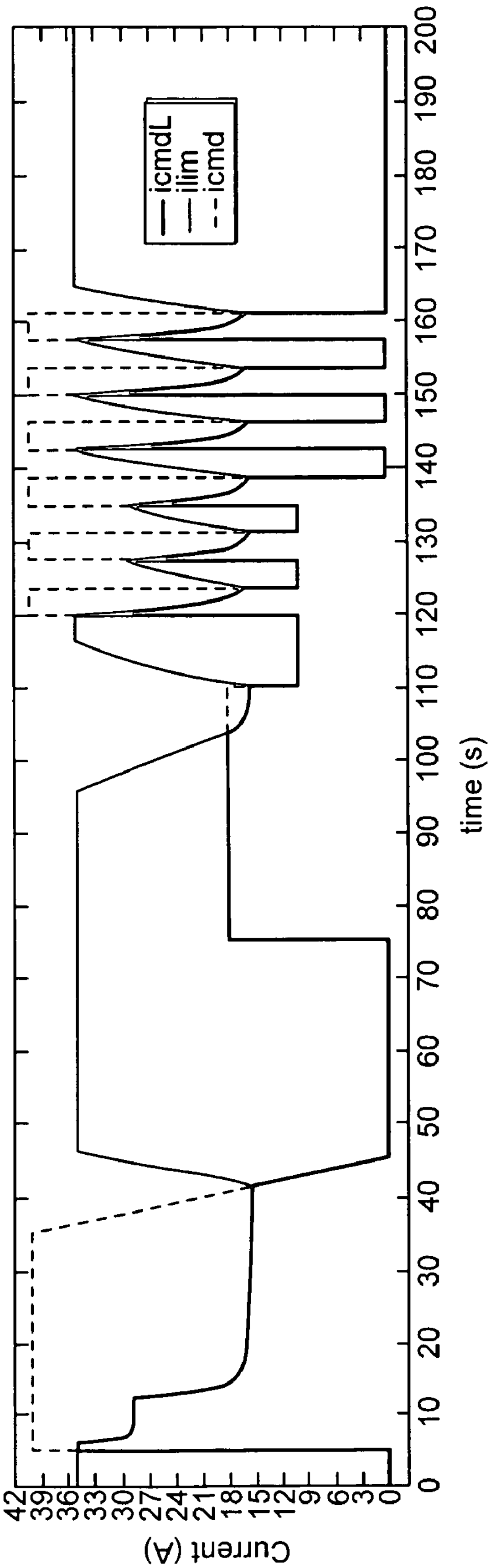
Figure 3C:
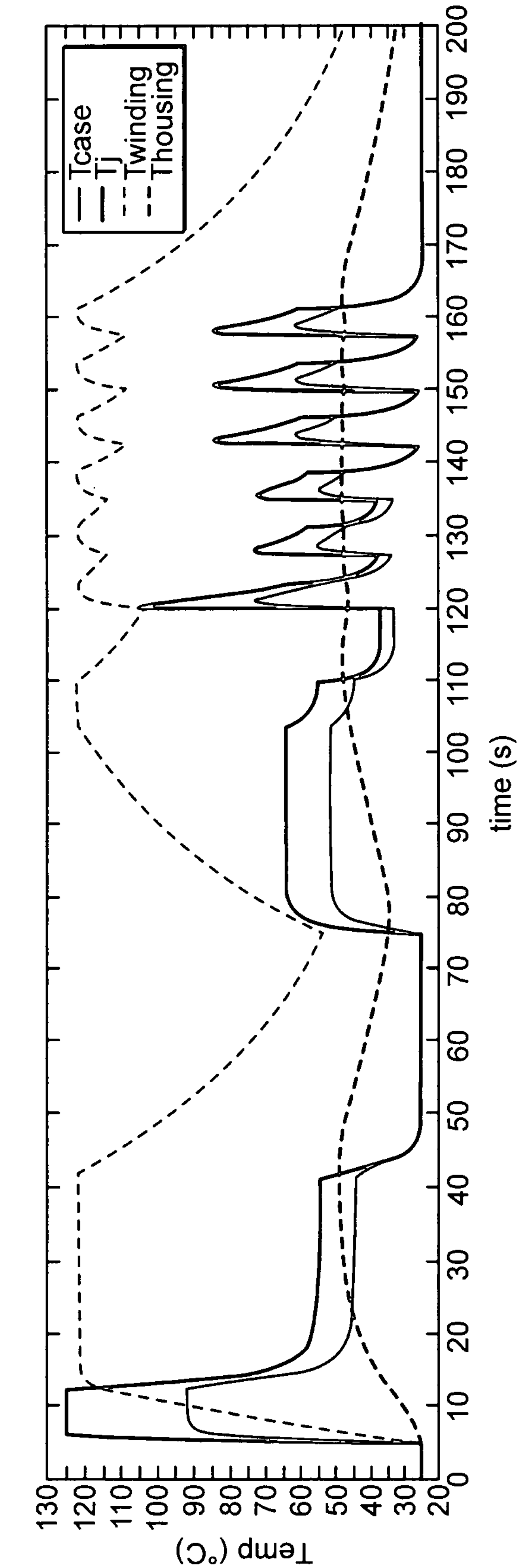

The graphs of FIGS. 3*a*–*c* help illustrate the dynamic current command limits in operation. FIG. 3*a* exemplifies the dynamically changing limits over time. A fixed limit is shown along with each of two dynamically determined limits. For example, one of the limits may be set in response to estimated transistor temperature. The other of the limits may be determined by the motor windings' estimated temperature.

In FIG. 3*b*, a generated command ($I_{cmd}$) requesting current is changing over time. The lowest limit at every given point in time for the three limits shown in FIG. 3*a* is applied to the generated command to prevent the command from requesting more current than any of the three limits would permit. The limited command ($I_{cmdL}$) is illustrated. FIG. 3*c* shows the various changing temperatures over time including the estimated temperature of a power transistor case ($T_{case}$), the estimated temperature of the semiconductor junction in the power transistor ($T_j$), the estimated temperature of the motor windings ($T_{winding}$) and the estimated temperature of the motor housing ($T_{housing}$). The dynamic limits in FIG. 3*a* are responsive in part to the temperatures exhibited in FIG. 3*c*.

While the methods of the invention may be used in a wide variety of applications, one embodiment shall be described herein in detail. A brushless motor can be controlled using the principles described above. Field oriented control circuits are known for use in controlling three-phase brushless motors. A field oriented current controller handles motor currents and voltages in the d-q (direct and quadrature) reference frame of the rotor. The three measured motor currents from the three-phase state reference frame of the windings are mathematically transformed to the two-axis rotating d-q reference frame, prior to processing by the PI controller. Similarly, voltages applied to the motor are mathematically transformed from the d-q frame of the rotor to the three phase reference frame of the windings before they can be used by a pulse width modulator. A processor implementing dynamic current limit setting may be used in conjunction with field oriented control to limit the generated current commands. A computer program on computer readable medium is accessed by the processor to calculate the limits and apply them to the generated commands for motor current.

Figure 4:
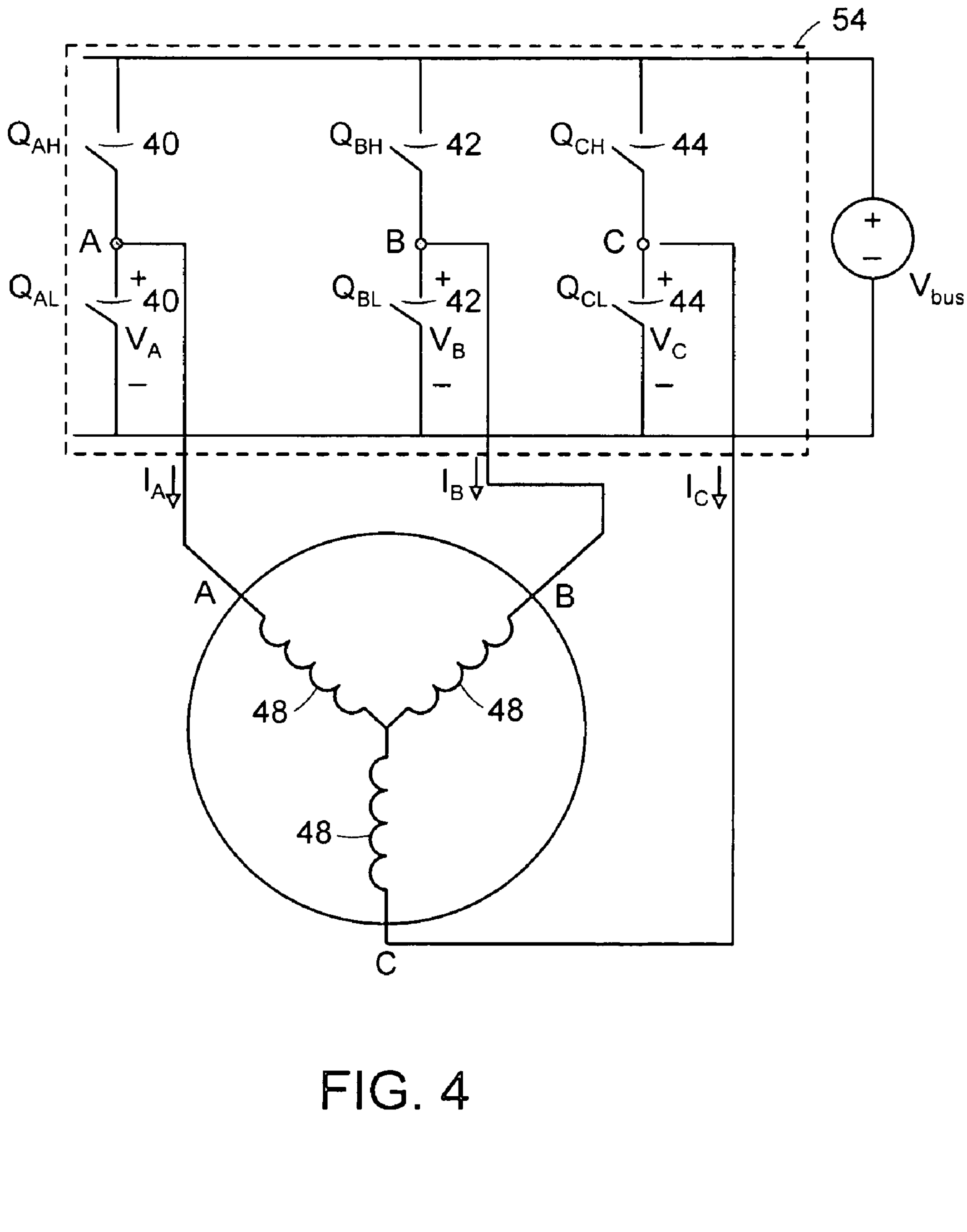
FIG. 4 is a schematic diagram of a three phase motor for use in an embodiment of the present invention.
Figure 5:
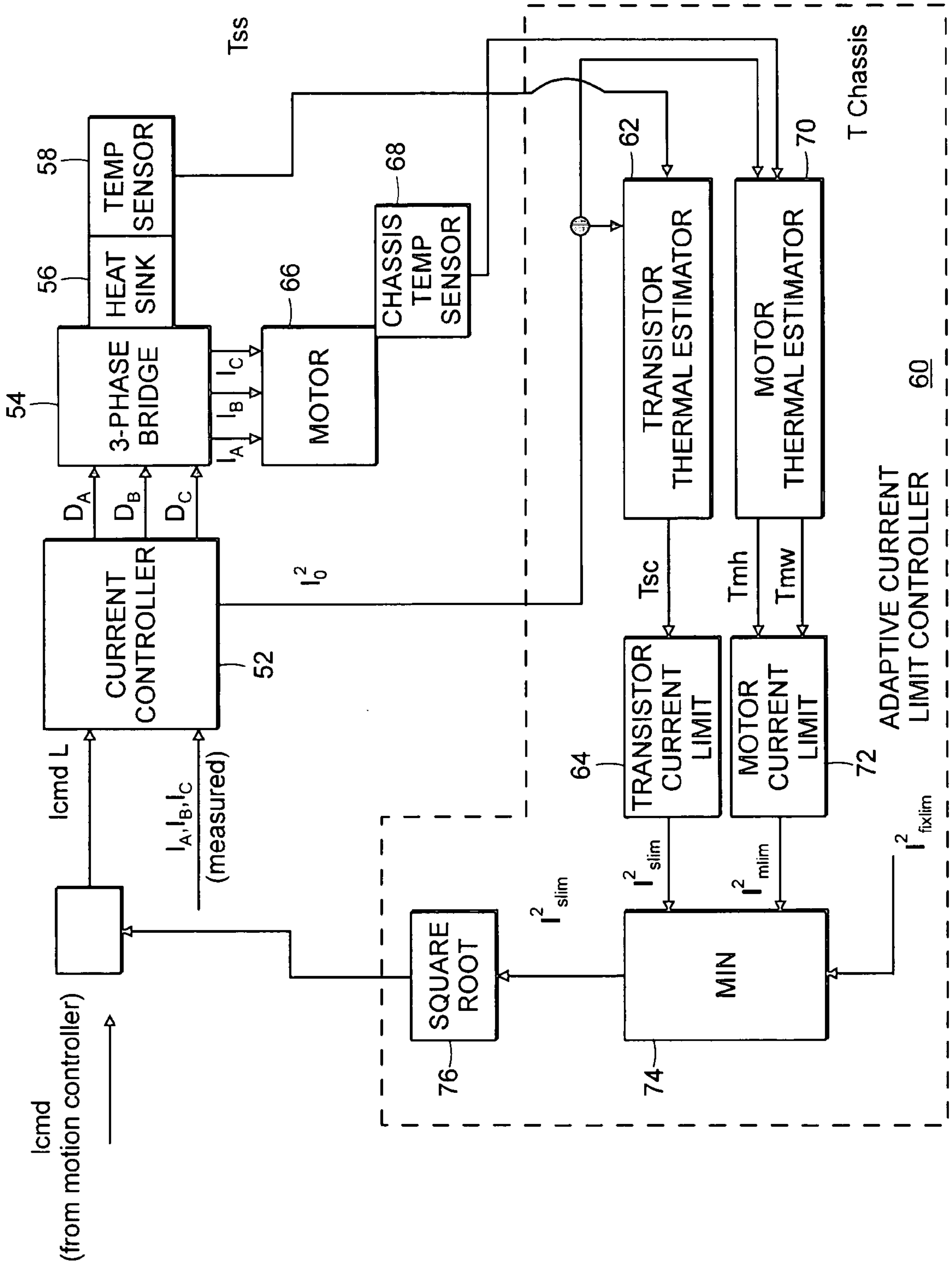
FIG. 5 is a schematic block diagram of a dynamically current limited motor in accordance with an embodiment of the present invention.

Referring now to FIGS. 4 and 5, a brushless motor has three pairs 40, 42, 44 of two power transistors in a 3-phase bridge configuration 54 for providing current to each of three motor windings 48. Referring to FIG. 5, a command ($I_{cmd}$) for motor torque is intended for a motor drive current controller 52. In the embodiment of FIG. 5, the controller 52 is a field oriented controller. This command ($I_{cmd}$) represents the currents that are desired to be delivered to each of the windings depending upon the relative location of the windings at a given instant in time. It is this command for motor current that will be dynamically limited.

Limiting is performed to avoid overheating any of the power transistors 40, 42, 44 or the motor windings 48. Although there are six power transistors, sufficient accuracy has been achieved when reducing the power dissipation estimate to a single worstcase power dissipation for all of the six power transistors. The currents through each pair of transistors are measured and provided to an adaptive current limit controller 60 in the form of an effective current $I_o$. $I_o$ is the magnitude of the motor drive current.

The derivation of a single estimate for power dissipation in power transistors of a brushless three phase motor shall now be explained. The derivation assumes that the three phase currents are measured and that the transistor switches are pulse width modulated. A simple model for power loss in each switch is conduction loss. This is represented as:

$P_{SW}=(I_{SW}^2 R_{SW})\cdot D_{SW}$ $P_{SW}$=average power dissipation during a given switching cycle $D_{SW}$=duty cycle of switch $I_{SW}$=current through switch when switch is on $R_{SW}$=switch on-resistance Each of the three pairs of transistors A, B, and C include a high side (H) and a low side (L) transistor and therefore the following six equations describe power loss in each transistor:

$$P_{AH}=I_A^2 R_{SW} D_A \quad P_{AL}=I_A^2 R_{SW}(1-DA)$$

$$P_{BH}=I_B^2 R_{SW} D_B \quad P_{BL}=I_B^2 R_{SW}(1-D_B)$$

$$P_{CH}=I_C^2 R_{SW} D_C \quad P_{CL}=I_C^2 R_{SW}(1-D_C)$$

Where $D_A$, $D_{B,\ and}$ $D_C$ are the duty cycles of the low-side transistors and $I_A$, $I_B$, and $I_C$ are the motor phase currents.

These could be used in six separate thermal estimators, with fairly high accuracy (assuming the loss equation is fairly well-characterized). These equations can be reduced, however, to a more conservative estimate, in several ways. The duty cycle may be very conservatively estimated as 1 since $0 \leqq D \leqq 1$. In this case:

$$P_{AH},\ P_{AL} \leqq P_A = I_A^2 R_{SW}$$

$$P_{BH},\ P_{BL} \leqq P_B = I_B^2 R_{SW}$$

$$P_{CH},\ P_{CL} \leqq P_C = I_C^2 R_{SW}$$

This then reduces the system to three "worst-case" transistors (with duty cycle 1), one in each phase leg. This can be off by at worst a factor of 2.0 if $D_A$=½ then the power loss $P_{AH}=P_{AL}=½\ I_A^2 R_{SW}$.

A less conservative duty cycle estimate takes the worst case duty cycle for each phase leg.

$$P_{AH},\ P_{AL} \leqq P_A = I_A^2 R_{SW}\ \mathrm{MAX}\ (D_A,\ 1-D_A)$$

$$P_{BH},\ P_{BL} \leqq P_B = I_B^2 R_{SW}\ \mathrm{MAX}\ (D_B,\ 1-D_B)$$

$$P_{CH},\ P_{CL} \leqq P_C = I_C^2 R_{SW}\ \mathrm{MAX}\ (D_C,\ 1-D_C)$$

In a three-phase system, we often use a synchronous reference frame modeling the currents and voltages in terms of direct and quadrature components. Using this model produces currents, voltages, and duty cycles $I_d$, $I_q$, $V_d$, $V_q$, $D_d$, $D_q$, such that $$I_a=I_q \cos \theta_e + I_d \sin \theta_e = I_o \cos (\theta_e - \Phi_O)$$

$$I_b = I_q\cos\left(\theta_e - \frac{2\pi}{3}\right) + I_d\sin\left(\theta_e - \frac{2\pi}{3}\right) = I_o\cos\left(\theta_e - \frac{2\pi}{3} - \Phi_0\right)$$

$$I_c = I_q\cos\left(\theta_e - \frac{4\pi}{3}\right) + I_d\sin\left(\theta_e - \frac{4\pi}{3}\right) = I_o\cos\left(\theta_e - \frac{4\pi}{3} - \Phi_0\right)$$

where $$I_o^2 = I_d^2 + I_q^2,\ \Phi_0 = \tan^{-1}\frac{I_d}{I_q}$$

and $\Phi_e$ is the electrical phase angle of the rotor field's back-emf relative to phase A.

similarly $$D_a=D_q \cos \theta_e + D_d \sin \theta_e + D_n = D_o\ \mathrm{COS}\ (\theta_e - \Phi_o) + D_n$$

$$D_b = D_q\cos\left(\theta_e - \frac{2\pi}{3}\right) + D_d\sin\left(\theta_e - \frac{2\pi}{3}\right) + D_n = D_o\cos\left(\theta_e - \frac{2\pi}{3} - \Phi_0'\right) + D_n$$

$$D_c = D_q\cos\left(\theta_e - \frac{4\pi}{3}\right) + D_d\sin\left(\theta_e - \frac{4\pi}{3}\right) + D_n = D_o\cos\left(\theta_e - \frac{4\pi}{3} - \Phi_0'\right) + D_n$$

where $$D_o^2 = D_d^2 + D_q^2,\ \Phi_0' = \tan^{-1}\frac{D_d}{D_q}$$

The system can be simplified on the basis that any given phase current $I_a$, $I_b$, and $I_c$ is less in amplitude than $I_o$, the amplitude of the modeled current in the d-q reference frame.

$$|I_a|, |I_b|, |I_c| \le I_o = \sqrt{I_d^2 + I_q^2}$$

Therefore, we can consider a worst case switch to have current $I_o$ giving maximum power dissipation of $(I_d^2+I_q^2) R_{SW}$ if duty cycle is conservatively estimated at one or $(I_d^2+I_q^2) R_{SW} D_{MAX}$ if duty cycle is taken as $D_{MAX}$=MAX ($D_A$, $1-D_A$, $D_B$, $1-D_B$, $D_C$, $1-D_C$). The average value of $I_a^2$ over the commutation cycle is $<I_a^2>=<I_o^2 \cos(\theta_e-\Phi_o)>=I_o^2<\cos(\theta_e-\Phi_o)>=\frac{1}{2}I_o^2$. Therefore using $I_o$ for current is over conservative by at worst a factor of 2 relative to the individual phase currents.

Further simplification of the dissipation estimate can be achieved by averaging over a well-chosen time interval. If we are using the power dissipation estimate for a thermal model with slow dynamics (e.g., a long time constant), then we get the same results from an instantaneous, power estimate as we do an average power estimate. The average is taken over a time interval $T_{av}$ where $T_{av} \ll \tau$, $\tau$ being the shortest time constant in the thermal model. A good rule of thumb would be $$T_{av} < \frac{1}{20}\tau.$$

If the same assumptions are made, the same result for temperature will be obtained averaging an instantaneous power dissipation estimates over a time interval $T_{av}$ as for calculating temperature using an estimate of average power over time $T_{av}$. But it is possible to make additional assumptions for an estimate of average power. For instance, if $I_A^2=I_O^2(\cos^2\omega t)$, and $|\omega T_{av}|>1$, then $I_A^2$ oscillates between zero and $I_o^2$ while $<I_A^2>$ over time $T_{av}$ hovers no higher than $\frac{1}{2} I_o^2$. The upper bound for $<I_A^2>$ depends on $\omega T_{av}$ but if $|\omega T_{av}|>1$, this drops closer to $\frac{1}{2} I_o^2$ thereby recovering some of the conservativeness of the previous simplifications. The exact formula for an upper bound for $<I_A^2>$ is $I_o^2$ $$< I_A^2 > \text{ is } I_0^2 \cdot \left(1/2 + \left|\frac{\sin\omega T_{av}}{2\omega T_{av}}\right|\right)$$

which can be approximated by linear and/or quadratic functions of $\omega$.

These approaches can be combined into a single power dissipation estimate:

$$P_{worst\text{-}case}=(<(I_d^2+I_q^2)\cdot\alpha_D>\cdot f(\omega_e \cdot T_{av}))\cdot R_{SW}$$

where $\alpha_D$=either 1 (easy, brute force upper bound) or max ($D_A$, $1-D_A$, $D_B$, $1-D_B$, $D_C$, $1-D_C$)

f(x) is a convenient upper bound so that $$f(x) \ge 1/2 + \left|\frac{\sin x}{2x}\right|$$

$$\omega_e = \frac{d\theta_e}{dt}$$

is the electrical frequency or commutation frequency of the system.

As an example, $f(x)=\max(1-0.245\,x^2,\ 0.64-0.0063|x|)$ can be used for f(x).

The transistor thermal estimator 62 computes a power dissipation estimate $P_{diss}$, as discussed above or some other way, and uses it to estimate temperature of a transistor case ($T_{sc}$). To avoid overheating, this will be a worst case estimate for any of the six power transistors. A temperature sensor 58 is located in close thermal proximity to a heat sink 56 for the power transistors. Thus, a measured heat sink temperature ($T_{ss}$) proximate a power transistor can be used in the temperature estimate. The estimated temperature for a switching transistor case equals $$H_1(s)Tss+H_2(s)P_{diss}=T_{sc}$$

where $H_1(s)$ and $H_2(s)$ are system transfer functions that can be calculated for a particular system using standard thermal modeling techniques. A thermal model is used to arrive at specific equations for calculating transistor (or "switch") case temperature. For example, one such linear system thermal model is as follows:

$$C_{sc}\frac{dT_{sc}}{dt} = P_{diss} + \frac{T_{ss} - T_{sc}}{R_{scs}}$$

Here in accordance with the model, the thermal capacitance of the component's case ($C_{sc}$) when multiplied by the rate of change of the case temperature ($T_{sc}$) is equal to the power dissipation ($P_{diss}$) at the transistor junction representing heat transferred from the junction to the case minus heat removed from the case by the heat sink. The heat lost to the heat sink is shown in the second term as the difference in temperature between the measured heat sink temperature ($T_{ss}$) and the case temperature ($T_{sc}$) divided by the thermal resistance between the case and the heat sink ($R_{scs}$). In each dynamic interval, the previously estimated case temperature and junction temperature are used to calculate a new estimate.

A current limit ($I_{SLIM}$) is determined 64 such that the transistor junctions are prevented from overheating. Using the maximum desired temperature for the transistor junction, the power dissipation must be kept small enough to avoid going beyond that temperature.

$$T_{MAX}=T_{SC}+P_{LIM}\,R_{SJC}.$$

$T_{MAX}$ is the maximum desired junction temperature, $T_{SC}$ is the estimated case temperature, $P_{LIM}$ is the maximum acceptable power dissipation given $T_{SC}$, $R_{SJC}$ is the switch junction-case thermal resistance. Solving this equation for $P_{LIM}$ we get $(T_{MAX}-T_{SC})/R_{SJC}$. We also use the relationship between power dissipation and current, $P_{LIM}=KI^2_{LIM\ RSEFF}$.

$R_{SEFF}$ is the effective on resistance of the power transistors. We solve for $I_{SLIM}$ and substitute the terms determined for $P_{LIM}$.

$$I_{SLIM}=\sqrt{P_{LIM}/KR_{SEFF}}=\sqrt{(T_{MAX}-T_S)/KR_{SJC}R_{SEFF}}$$

Given the conservative estimates, $I_{SLIM}$ will be a safe current level for the transistors at the instant when case temperature is estimated to be $T_{SC}$.

Because the motor windings have a relatively large thermal capacitance, calculation of a safe current level for the windings is a little more straightforward. The motor current is obtained from the measured phase currents using the synchronous reference frame to supply $I_o$. The thus measured motor current is used to estimate power dissipation in the windings.

$$P_m=R_{MEFF}I_o^2$$

where $P_M$ is the power dissipation in the windings, $R_{MEFF}$ is the effective electrical resistance of the windings, $I_o$ is the effective motor drive current. If desired, $R_{MEFF}$, could be allowed to vary with temperature.

A temperature sensor 68 placed in thermal contact with the motor body or chassis provides a measure of temperature that can be used to help get an estimate of the motor housing temperature and motor winding temperature. It is assumed in this embodiment that the motor 66 includes a motor housing in good thermal contact with a chassis and windings contained within the motor housing. A linear system thermal model suitable for the motor housing may be used.

$$Cmh\frac{dT_{mh}}{dt}=\frac{T_{mw}-T_{mh}}{R_{mwh}}+\frac{T_{mc}-T_{mh}}{R_{mhc}}$$

where Cmh=thermal capacitance of the motor housing, $T_{mh}$=temperature of the motor housing, $T_{mw}$=temperature of the motor windings, $T_{mc}$=measured temperature of the chassis, $R_{mwh}$=thermal resistance between the motor windings and the motor housing, $R_{mhc}$=thermal resistance between the motor housing and chassis. The first term represents heat flowing from the windings to the housing and the second term represents heat flowing from the chassis flowing to the housing. A further relationship to complete the model for the motor windings is as follows:

$$C_{mw}\frac{dT_{mw}}{d_t}=\frac{T_{mh}-T_{mw}}{R_{mwh}}+P_m$$

where $C_{mw}$=thermal capacitance of the motor winding and $P_m$ is the estimated power dissipation in the motor windings. The first term represents heat flowing from the housing to the windings. As discussed above, power dissipation is estimated as a function of measured current. The motor housing and motor windings are thermally coupled, therefore these equations are solved together to arrive at estimated temperatures 70.

Once the winding temperature estimate is provided, a safe current level for the windings that will keep them from overheating is calculable 72. The following equation gives the safe current level as $$I_{mLIM}=\sqrt{K(T_{WMAX}-T_{MW})}$$

where $I_{MLIM}$ is the dynamically-determined safe current level as a function of motor winding temperature estimate $T_{MW}$, K is an empirically-determined constant and $T_{WMAX}$ is the maximum desired temperature for the windings.

The safe current levels determined for the windings and the transistors are used to limit the commands requesting motor current. The commands are prevented from requesting more current than would be acceptable to either the windings or the transistors. Since it is the magnitude of the current that is being limited it can be efficient to consider the square of the transistor current and the square of the motor current limit so as to select the smaller of the squares 74. The selected minimum is then subjected to a square root calculation 76 to produce the limit to be applied to the externally-generated current command. A fixed limit on the command may also be included in limiting the command. In selecting the minimum limit, the fixed limit can be considered along with the dynamically determined limits. Thus, even when the unit is cool, the fixed limit prevents currents in excess of acceptable levels to the components. By relying on dynamically determined limits, the fixed limit may be higher than it would be if it were the only restriction on current level.

Figure 6:
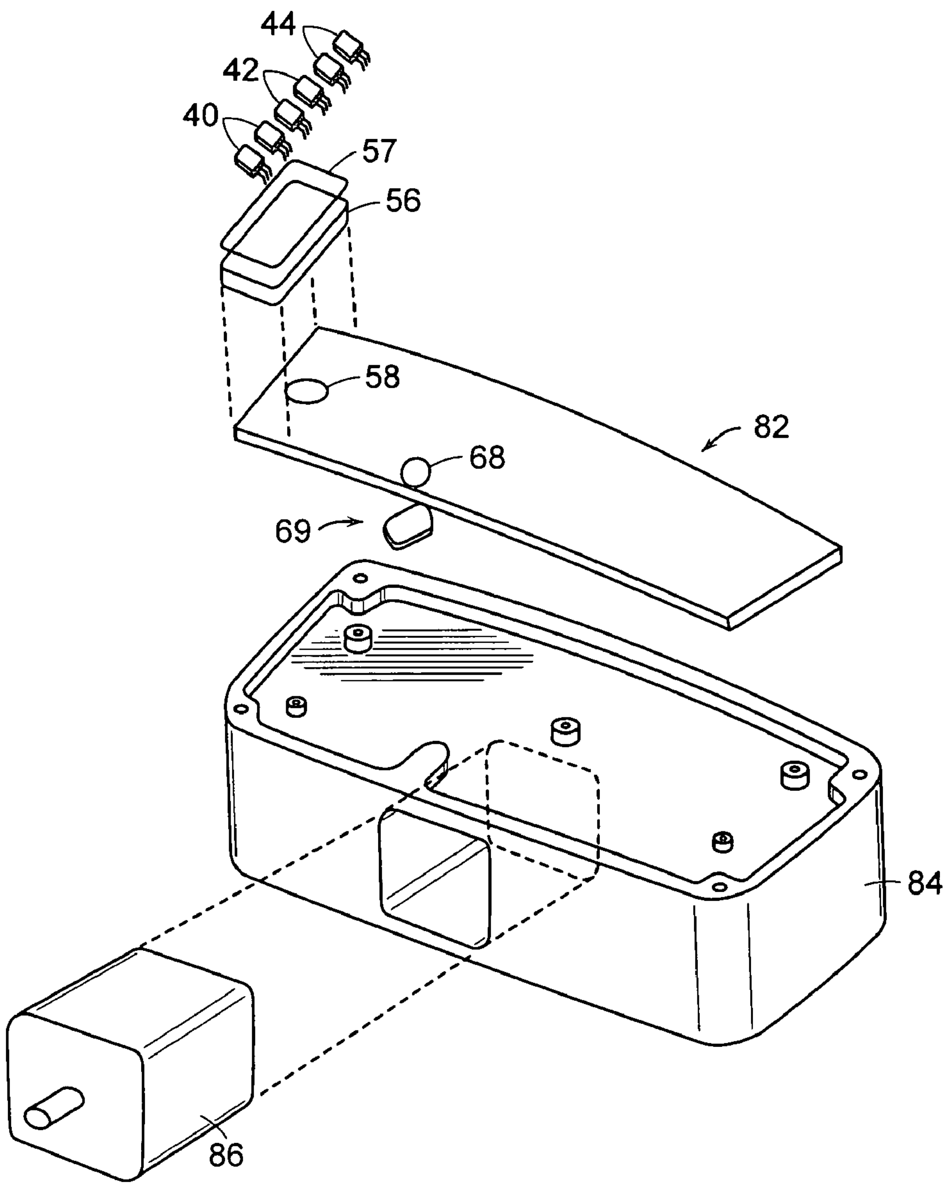
FIG. 6 is an exploded view of a motor chassis and motor control electronics incorporating an embodiment of the present invention.

Referring now to FIG. 6, a motor taking advantage of dynamic current limit setting may be arranged for relatively simple assembly. The circuit board 82 would typically include a mounting port for use in securing the electronic circuit board to a motor chassis 84. Rather than obtaining a direct measure of temperature of the motor windings, in accordance with embodiments of the present invention, a thermal sensor 68 may be located for making thermal contact with the chassis 84. A thermally conductive interface material 69 with suitable mechanical compliance may be inserted between the thermal sensor 68 and the chassis 84. The measured temperature can be used in estimating temperature of the motor housing 86 and motor windings. A second thermal sensor 58 is located in the proximity of a heat sink 56 for the power transistors 40, 42, 44 to provide a second temperature. A thermally conductive, mechanically compliant interface material 57 may be inserted between the power transistors and their heat sink 56. Current sensors on the circuit board provide a measure of the amount of motor phase currents. These motor phase currents are converted to the direct and quadrature terms by a frame-of-reference translator that uses the rotor position measured by an encoder or other position sensing device. A processor receives the current and temperature information. Responsive to the temperature measured near the motor chassis 84, the temperature near the heat sink 56 for the power transistors, and the measure of the motor drive current, the processor dynamically sets a limit on current commands that control the amount of motor drive current. The issuance of current commands may be generated in accordance with any number of well known motion control or speed control techniques. Protective current limits are set on the basis of a variety of concerns. The current limit determined by the processor may be the lowest from among any of a fixed current limit, a current limit dynamically determined with respect to the power transistors and a current limit dynamically determined with respect to the motor windings.

Figure 7:
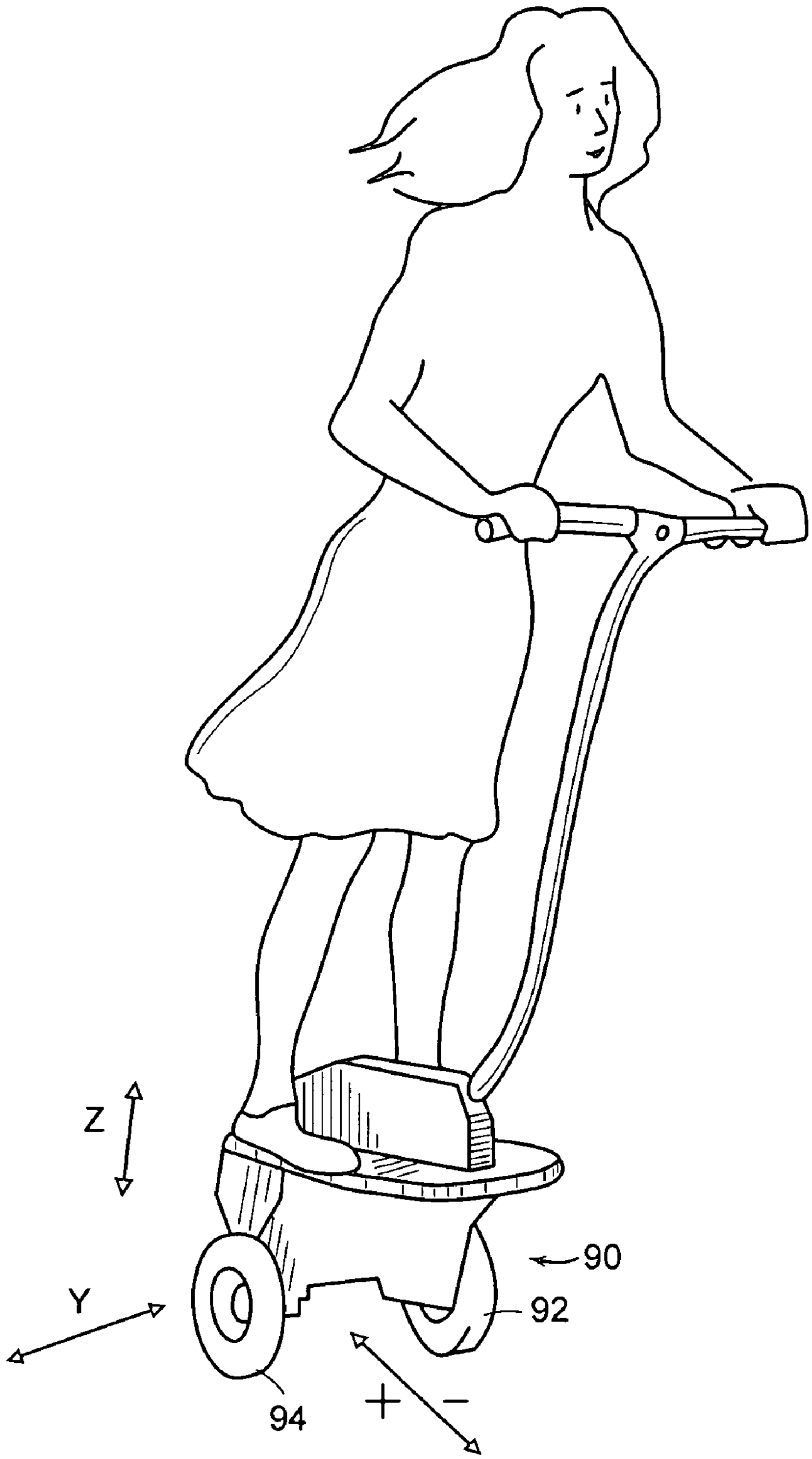
FIG. 7 is a perspective view of a two wheeled self-balancing vehicle that may incorporate the dynamic current limiting of the present invention.
Figure 8:
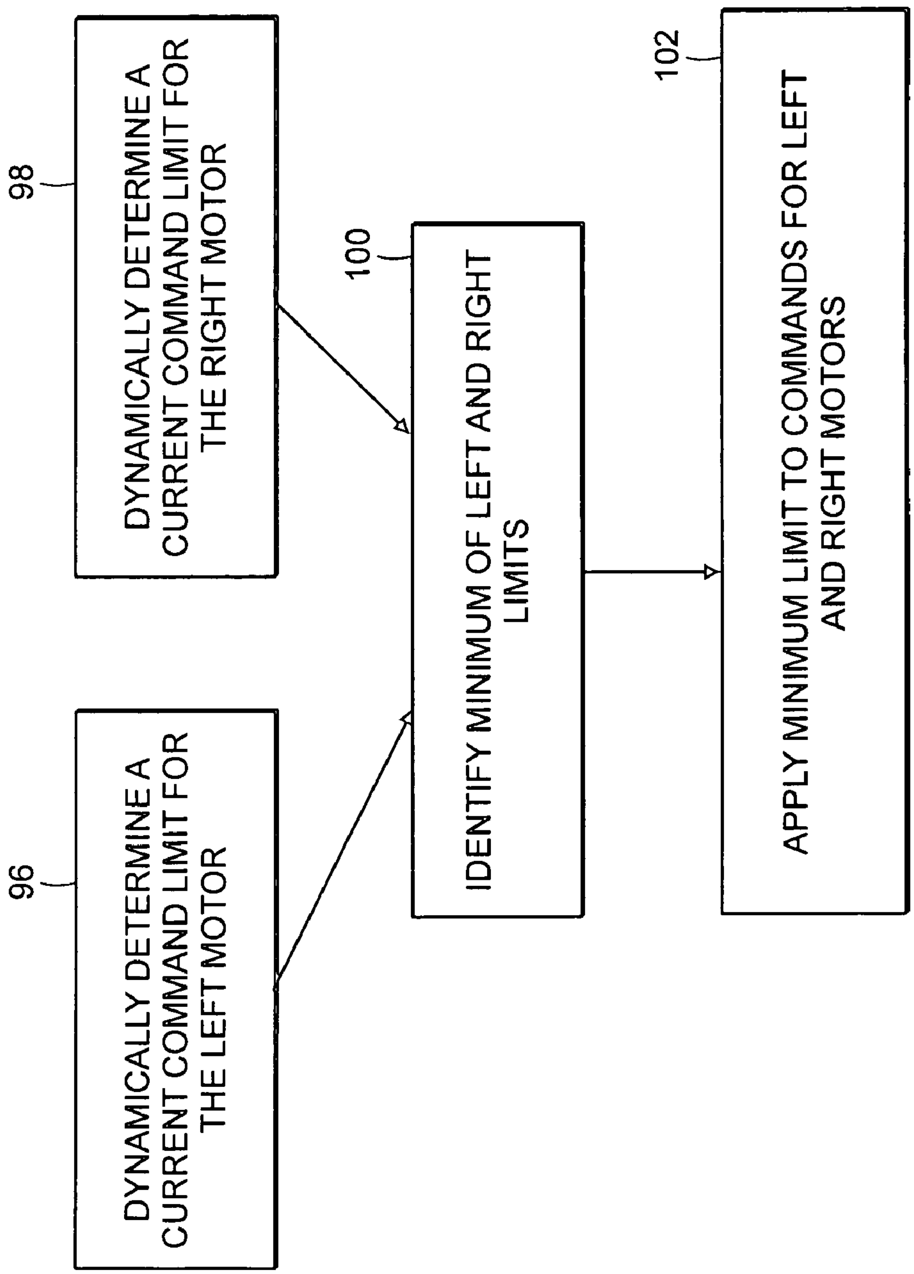
FIG. 8 is a flow chart of an embodiment of the present invention for use with a left and right wheeled vehicle.

In a particular embodiment of the invention, current limiting can be employed for use in a motorized vehicle 90 having at least a left 92 and a right 94 wheel, as shown by example in FIG. 7. The example is a self-balancing human transporter as described in U.S. Pat. Nos. 6,288,505 and 6,367,817 which may be adapted to incorporate such current limiting. The full disclosure of both of these patents is hereby incorporated by reference herein. With a motor driving the left wheel 92 and a motor driving the right wheel 94, the vehicle may undesirably turn if one wheel is prevented from being driven at the same speed as the other wheel. Thus, if one wheel's motor gets hot, dynamic current limiting may impose a lower current limit on that motor. If a high current to both wheels is called for, the hot motor may get less current due to the current limit thus slowing that wheel. To prevent undesired response by the vehicle due to unequal heating, it is advantageous for the two motors to share current limit signals. Referring to FIG. 8, each motor can calculate and determine 96, 98 a lowest limit for current commands for itself as described above. In addition, the two motors can be sharing a processor or can facilitate communication between their respective processors. The lowest current limit 100 as between the left motor and the right motor can be applied 102 to both motors. In this way, lopsided control of the two wheels is avoided. The same current limit is thus applied 102 to both motors.

The adaptive current limit control methods of the invention may be embodied in many different forms, including, but in no way limited to, computer program logic for use with a processor (e.g., a microprocessor, microcontroller, digital signal processor, or general purpose computer), programmable logic for use with a programmable logic device (e.g., a Field Programmable Gate Array (FPGA) or other PLD), discrete components, integrated circuitry (e.g., an Application Specific Integrated Circuit (ASIC)), or any other means including any combination thereof.

Computer program logic implementing all or part of the functionality previously described herein may be embodied in various forms, including, but in no way limited to, a source code form, a computer executable form, and various intermediate forms (e.g., forms generated by an assembler, compiler, linker, or locator.) Source code may include a series of computer program instructions implemented in any of various programming languages (e.g., an object code, an assembly language, or a high-level language such as Fortran, C, C++, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The computer program may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device. The computer program may be fixed in any form in a signal that is transmittable to a computer using any of various communication technologies, including, but in no way limited to, analog technologies, digital technologies, optical technologies, wireless technologies, networking technologies, and internetworking technologies. The computer program may be distributed in any form as a removable storage medium with accompanying printed or electronic documentation (e.g., shrink wrapped software or a magnetic tape), preloaded with a computer system (e.g., on system ROM or fixed disk), or distributed from a server or electronic bulletin board over the communication system (e.g., the Internet or World Wide Web.)

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL.)

Of course, it should be understood that various changes and modifications to the preferred embodiments described above will be apparent to those skilled in the art. For example, a number of mathematical equations may be used to substitute for those described in order to obtain the desired estimates. Moreover, the locations of the temperature measurements may vary depending upon the structure and arrangement of any given circuit board. Indeed, numerous various modifications will be apparent to those skilled in the art. It is, therefore, intended that all such changes and modifications be covered by the following claims.

What is claimed is:

1. A method for producing commands for current comprising:

generating a command for current; and preventing the command from exceeding a limit dynamically determined as a function of power dissipation in a component estimated from a measured current level indicative of current in the component and as a function of a measured temperature proximate to the component.

2. The method of claim 1 wherein the command controls motor drive current and the component comprises a motor winding.

3. The method of claim 1 wherein the command controls motor drive current and the component comprises a power transistor.

4. The method of claim 1 wherein the limit is further a function of a predetermined maximum temperature for the component.

5. The method of claim 1 wherein the command is further prevented from exceeding a fixed limit.

6. The method of claim 1 wherein the command is further prevented from exceeding a second limit dynamically determined as a function of power dissipation in a second component estimated from a measured current level indicative of current in the second component and as a function of a measured temperature proximate to the second component.

7. In a system issuing commands for current, the improvement comprising:

dynamically determining a first level of current that will not overheat a first component;

dynamically determining a second level of current that will not overheat a second component; and preventing the commands from requesting current in excess of any of the first and second dynamically determined levels.

8. The improvement of claim 7 further comprising preventing the commands from requesting current in excess of a fixed limit.

9. The improvement of claim 7 wherein said first component comprises a motor winding.

10. The improvement of claim 7 wherein said second component comprises a power transistor.

11. The improvement of claim 9 wherein dynamically determining a first level includes dynamically determining power dissipation in the motor winding estimated from a measure of amount of a motor drive current.

12. The improvement of claim 11 wherein the first level is a function of estimated temperature of the motor winding determined as a function of a measured temperature and as a function of estimated power dissipation in the motor winding.

13. The improvement of claim 12 wherein dynamically determining power dissipation in the motor winding is further estimated as a function of the estimated temperature of the motor winding.

14. The improvement of claim 12 wherein the first level is further a function of a predetermined maximum temperature for the motor winding.

15. The improvement of claim 10 wherein determining a second level includes dynamically determining power dissipation in the power transistor estimated from a measure of transistor current.

16. The improvement of claim 15 wherein the second level is a function of estimated temperature of the power transistor determined as a function of a temperature measured proximate the power transistor and as a function of estimated power dissipation in the power transistor.

17. The improvement of claim 16 wherein dynamically determining power dissipation in the power transistor is further estimated as a function of the estimated temperature of the power transistor.

18. The improvement of claim 16 wherein the second level is further a function of a predetermined maximum temperature for the power transistor.

19. In a system issuing commands for motor current in a motor, the improvement comprising:

dynamically determining a first limit as a function of measured motor current and as a function of a measured temperature proximate the motor;

dynamically determining a second limit as a function of measured transistor current and as a function of measured temperature proximate the transistor; and preventing the commands for current from exceeding any of the first and second dynamically determined limits.

20. The improvement of claim 19 further comprising preventing the commands for motor current from exceeding a fixed limit.

21. The improvement of claim 19 wherein dynamically determining a first limit includes dynamically determining power dissipation in the motor winding estimated from the measured motor current.

22. The improvement of claim 21 wherein dynamically determining a first limit further includes estimating temperature of the motor winding as a function of the measured temperature proximate the motor and as a function of the dynamically determined power dissipation in the motor winding and examining the estimated temperature relative to a predetermined maximum temperature for the motor winding.

23. The improvement of claim 22 wherein dynamically determining power dissipation in the motor winding is further estimated as a function of the estimated temperature of the motor winding.

24. The improvement of claim 19 wherein determining a second limit includes dynamically determining power dissipation in the transistor estimated from the measured transistor current.

25. The improvement of claim 24 wherein dynamically determining a second limit further includes estimating temperature of a junction in the transistor as a function of the measured temperature proximate the transistor and as a function of the dynamically determined power dissipation in the transistor and examining the estimated temperature relative to a predetermined maximum temperature for the transistor junction.

26. The improvement of claim 25 wherein dynamically determining power dissipation in the transistor is further estimated as a function of the estimated temperature of the transistor.

27. A computer program product for use in controlling commands for motor current, the computer program product comprising a computer usable medium having computer readable code thereon, the computer readable program code including:

program code for dynamically determining a first limit as a function of estimated temperature of a motor winding;

program code for dynamically determining a second limit as a function of estimated temperature of a power transistor; and program code for preventing the commands for motor current from exceeding any of the first and second dynamically determined limits.

28. The computer program product of claim 27 further comprising program code for preventing the commands for motor current from exceeding a fixed limit.

29. A computer program product for use in controlling commands for motor current, the computer program product comprising a computer usable medium having computer readable code thereon, the computer readable program code including:

program code for dynamically determining a first limit as a function of measured motor current and as a function of a measured temperature proximate the motor;

program code for dynamically determining a second limit as a function of measured transistor current and as a function of measured temperature proximate the transistor; and program code for preventing the commands for current from exceeding any of the first and second dynamically determined limits.

30. The computer program product of claim 29 further comprising program code for preventing the commands for motor current from exceeding a fixed limit.

31. A control circuit for a motor comprising:

motor windings;

at least three power transistors providing current to said motor windings;

a current sensor measuring at least one motor current;

a temperature sensor measuring temperature of a heat sink in proximity to the motor;

a processor responsive to the measured current and the measured temperature to calculate estimated temperature of the one of the at least three power switches, said processor further calculating estimated temperature of the motor winding and dynamically determining a current command limit as a function of estimated power switch temperature, a second current command limit as a function of estimated motor winding temperature and a lowest limit from among the first current command limit, the second current command limit and a fixed limit; and limiting current commands to said motor to no more than the dynamically determined lowest limit.

32. The control circuit of claim 31, wherein such motor is brushless.

33. A control circuit for a motor comprising:

motor windings;

at least three power transistors providing current to said motor windings;

a current sensor measuring at least one power transistor current;

a temperature sensor measuring temperature of a heat sink near at least one of the power transistors;

a processor responsive to the measured current and the measured temperature to calculate estimated temperature of the one of the at least three power switches, said processor further calculating estimated temperature of the motor winding and dynamically determining a current command limit as a function of estimated power switch temperature, a second current command limit as a function of estimated motor winding temperature and a lowest limit from among the first current command limit, the second current command limit and a fixed limit; and limiting current commands to said motor to no more than the dynamically determined lowest limit.

34. The control circuit of claim 33, wherein such motor is brushless.

35. A method for producing commands for current in a device having a plurality of ground contacting members each ground contacting member separately driven by its respective motor, the method comprising:

dynamically determining a current command limit for each respective motor, applying a lowest of the dynamically determined current command limits to each of the respective motors so that current commands to each of the respective motors are subject to the same current command limit.

36. The method of claim 35, wherein such device is a vehicle.

37. The method of claim 36, wherein such plurality of ground contacting members are two co-axial wheels.

* * * * *